US010438706B2

(12) United States Patent
Eckardt et al.

(10) Patent No.: US 10,438,706 B2
(45) Date of Patent: Oct. 8, 2019

(54) VENTING SYSTEM FOR THE CONTAINMENT OF A NUCLEAR PLANT AND METHOD OF OPERATING THE VENTING SYSTEM

(71) Applicant: FRAMATOME GMBH, Erlangen (DE)

(72) Inventors: Bernd Eckardt, Bruchkoebel (DE); Norbert Losch, Offenbach (DE); Frank Zehe, Limburgerhof (DE)

(73) Assignee: Framatome GmbH, Erlangen (DE)

( * ) Notice: Subject to any disclaimer, the term of this patent is extended or adjusted under 35 U.S.C. 154(b) by 359 days.

(21) Appl. No.: 14/867,197

(22) Filed: Sep. 28, 2015

(65) Prior Publication Data

US 2016/0019986 A1    Jan. 21, 2016

Related U.S. Application Data

(63) Continuation of application No. PCT/EP2014/056068, filed on Mar. 26, 2014.

(30) Foreign Application Priority Data

Mar. 27, 2013    (DE) .................. 10 2013 205 524

(51) Int. Cl.
*G21C 9/004*    (2006.01)
*B01D 47/10*    (2006.01)
(Continued)

(52) U.S. Cl.
CPC ............ *G21C 9/004* (2013.01); *B01D 47/10* (2013.01); *G21C 19/303* (2013.01); *G21F 9/02* (2013.01);
(Continued)

(58) Field of Classification Search
CPC ..................................... G21C 9/004
See application file for complete search history.

(56) References Cited

U.S. PATENT DOCUMENTS 4,753,771 A * 6/1988 Conway ............... G21C 15/18
376/282
4,873,050 A * 10/1989 Eckardt ............... G21C 9/004
376/283
(Continued)

FOREIGN PATENT DOCUMENTS

DE    10328774 B3    1/2005
DE    10328773 B3    2/2005
(Continued)

OTHER PUBLICATIONS

U.S. Nuclear Regulatory Commission (NRC), SECY-12-0157, "Consideration of Additional Requirements for Containment Venting Systems for Boiling Water Reactors with Mark I and Mark II Containments", Accession No. ML 12345A030, Dec. 7, 2012.

*Primary Examiner* — Lily C Garner
(74) *Attorney, Agent, or Firm* — Laurence A. Greenberg; Werner H. Stemer; Ralph E. Locher (57) ABSTRACT

A pressure-relief system for a containment of a nuclear plant has a pressure-relief line which is led through the containment and is closed by a shutoff device, and a wet scrubber being switched into the pressure-relief line lying outside the containment, for the pressure-relief gas flow developing in the pressure-relief operating mode with the shutoff device being open. An effective, reliable operation of the wet scrubber with a compact structural configuration is made possible. This is achieved by a reservoir, arranged in the containment or fluidically connected therewith such that an overpressure, as compared with the outer environment, present in the containment, is transferred to the reservoir, and a feeding line which is led from the reservoir to the wet
(Continued)

scrubber and can be closed by a shutoff device, for feeding a liquid active as a scrubbing liquid from the reservoir to the wet scrubber.

16 Claims, 1 Drawing Sheet

(51) Int. Cl.
*G21C 19/303* (2006.01)
*G21F 9/02* (2006.01)
*G21C 9/06* (2006.01)
*G21D 3/04* (2006.01)

(52) U.S. Cl.
CPC ............ *G21C 9/06* (2013.01); *G21D 3/04* (2013.01); *Y02E 30/40* (2013.01)

(56) References Cited

U.S. PATENT DOCUMENTS

| | | | |
|---|---|---|---|
| 8,218,709 B2 * | 7/2012 | Eckardt | B01D 47/10 376/283 |
| 8,670,517 B2 | 3/2014 | Eckardt et al. | |
| 8,804,896 B2 | 8/2014 | Eckartdt et al. | |

FOREIGN PATENT DOCUMENTS

| | | | |
|---|---|---|---|
| DE | 102010035509 A1 | | 3/2012 |
| FR | 2675942 A1 | | 10/1992 |
| JP | 04238293 A | * | 8/1992 |
| JP | 04238293 A | | 8/1992 |
| JP | 06214081 A | | 8/1994 |
| JP | 08075886 A | | 3/1996 |
| JP | 2971614 B2 | | 11/1999 |

* cited by examiner

VENTING SYSTEM FOR THE CONTAINMENT OF A NUCLEAR PLANT AND METHOD OF OPERATING THE VENTING SYSTEM

CROSS-REFERENCE TO RELATED APPLICATION

This is a continuation application, under 35 U.S.C. § 120, of copending international application No. PCT/EP2014/056068, filed Mar. 26, 2014, which designated the United States; this application also claims the priority, under 35 U.S.C. § 119, of German patent application No. DE 10 2013 205 524.2, filed Mar. 27, 2013; the prior applications are herewith incorporated by reference in their entireties.

BACKGROUND OF THE INVENTION

Field of the Invention

The invention relates to a pressure-relief system, also referred to as a venting system, with integrated filtration for the containment of a nuclear plant, in particular for a boiling water reactor. It further relates to an associated operating method.

During major accidents in nuclear power plants involving a core meltdown, very high levels of airborne activity occur within the safety enclosure, also referred to as the containment, which can be released into the environment in significant quantities when there are large leakages and unpermitted overpressure situations. This airborne activity may in such cases cause high-level unwanted long-term land contamination in the area surrounding the nuclear power station, above all due to the high half-life periods of the different radionuclides contained, particularly iodine and cesium isotopes.

Different systems for overpressure limitation and pressure relief of the containment in accident situations are already installed in numerous nuclear power stations. These facilities allow the retention of aerosols and, in part, elementary iodine too, and also organic iodine compounds (organoiodine), and they often contain wet cleaning systems or scrubber systems for the pressure-relief flow, also referred to as the venting flow, with substantial water reservoirs in terms of volume in the form of tanks and other storage containers.

These large water reservoirs are necessary in order to limit the undesirable effects of the decay heat from the retained radioactive aerosols and iodine, namely temperature rise to water evaporation, and allow the cooling of hot gases to boiling point temperature in venting mode. A drying-out of the scrubber system would jeopardize the retention function and, in addition, cause the retained activity to be released again.

Furthermore, research on containment behavior in existing plants has shown that in certain accident scenarios significantly increased activity and, consequently, aerosol and iodine decay heats can be released. The water requirement in the scrubber facilities of the venting system is therefore significant in such situations and leads to correspondingly high-volume facilities which usually can no longer be housed in existing buildings. This means new installation buildings which bring with them substantial costs.

Existing retrofitted facilities such as scrubbers or sand bed filters, for example, and corresponding combinations of these, solve the problem of organoiodine retention, which has recently had to be re-evaluated on the basis of corresponding research findings, with a great deal of success in some cases. However, facilities of this kind still necessarily have to be protected from external influences, as a result of which they prove very expensive to construct and generate substantial costs.

The problem addressed by the invention involves identifying a remedial measure in this respect and providing a venting system for the containment of a nuclear power plant which allows effective and reliable operation of a wet scrubber for the venting flow with a simultaneously compact design, particularly with regard to the amounts of washing fluid to be made available. Furthermore, a particularly advantageous operating method for a venting system of this kind is to be specified.

SUMMARY OF THE INVENTION

It is accordingly an object of the invention to provide a venting system for the containment of a nuclear plant and method of operating the venting system that overcomes the above-mentioned disadvantages of the prior art devices and methods of this general type.

The invention is based on the knowledge that an improvement in known venting systems and associated scrubber facilities can be achieved through the passive development of existing water reservoirs, including in existing plants, to achieve higher safety standards. This facilitates a simplified layout of the containment and associated security systems and substantial cost reductions as a result.

The method according to the invention and the facilities are preferably used so that the gases or steam produced during emergency conditions with a core meltdown due to the residual heat released, including leakages, are completely drawn off in the event of overpressure and almost completely cleaned of airborne activity before being released into the environment. The retained activity is advantageously quickly fed back into the containment. In this way, relevant activity leakages and, as a consequence, ground contamination in the area surrounding the nuclear plant can be prevented.

With the design according to the invention, it is possible by producing passive propellant pressure by using accident-related pressure gradients, preferably combined with passive filling level control, for the water level (more generally: the scrubbing liquid level) in the scrubber facilities to be filled up before or at the start of the venting process and/or constantly kept within the desired range. In this case, liquid accumulations which exist in any case or are created as a result of the accident are used as washing fluid reservoirs, so that reliable operation is guaranteed, even with very small-sized external or additional storage containers.

The filling of the scrubber facilities may, on the one hand, take place when the venting system is started, in particular prior to the actual venting, using the maximum propelling, static pressure difference.

On the other hand, a propellant pressure may be generated passively, particularly through selective throttling of the venting flow in the gas inlet region of the scrubber facility utilizing flow-dynamic relationships, which propellant pressure draws the scrubbing liquid into the scrubber facility. The necessary negative intake pressure may be produced automatically, for example by selective throttling and a drop in pressure in the Venturi tube of a Venturi washer.

In this case, a negative propelling pressure difference >0.1 bar, preferably with a high pressure at the start of venting >1 bar, in relation to the feeding water reservoir, e.g. the wet well in a boiling water reactor or the building sump in a pressurized water reactor, is produced in the gas inlet region of the scrubber facility, e.g. by nozzles, especially Venturi nozzles, perforated nozzles and similar variants.

The water suction lines may furthermore be sized in such a way that even with a boiling pool with steam bubble formation in the suction line, effective plug conveying is made possible, particularly through a sufficiently small diameter of <25 mm, advantageously <15 mm.

Through a combination of suction lines of different nominal widths, initial rapid filling and subsequent filling level top-ups, including with a boiling pool, can each be separately optimized.

The aforementioned measures mean that comparatively large height differences of 5 to 30 m or more, for example, between the water reservoir (more generally: scrubbing liquid reservoir) and the scrubber unit can be overcome.

The adjustment and control of the filling level in the scrubber is preferably carried out via a float filling level control, preferably using a dirt-proof control ball lock or rotary slide valve. By connecting the two mechanisms in series, greater filling reliability can be achieved. In this case, for example, the control ball lock can be inserted at the water outlet and a rotary slide valve included upstream—integrated in the top-up line.

In particular, in venting mode and where evaporation occurs, e.g. through incoming overheated gas and/or through decay heat in the scrubber, the quantity of water evaporated in each case is passively fed back out of the reservoir.

In a further advantageous embodiment it is possible, even in after-venting mode without throughput, when there is a small incidence of decay heat of 10 to <50 kW, for example, through the combination of evaporation and convective heat delivery via the surfaces of the scrubber facility, to remove the heat generated and thereby achieve complete passivity and independence of the facility, even during long-term operation.

The maximum feeding rate is advantageously limited by throttle devices in the top-up line, such that in the case of variants with a very high decay heat of 500 to 1,000 kW, for example, on the one hand, the maximum amount of evaporated water (equivalent to the evaporation output) can be fed in and with attachment to a wet well as the reservoir, this limitation at the same time acts as an outflow limitation from the wet well. This means that if a line of this kind fails, no short-term wet well failure can occur and overfeeding of the leakage is prevented.

By positioning the inlet opening of the top-up line as low as possible in the wet well, even when the liquid level has dropped and the condensation pipes are exposed accordingly, the remaining liquid volume in the wet well can be used to top up the scrubber facility and therefore for effective gas purification in the scrubber facility. In particular, this produces the advantage that in the case of accident-related evaporation of the water normally covering the outlet openings of the condensation pipes, for example, during which the gas filtration which otherwise takes place in the wet well fails, at least the gas purification in the scrubber facility is retained, without further quantities of water having to be actively moved in the short and medium term, such as in difficult station blackout situations when pumps are not available, for example. In this way, safe operation of the plant and a substantial increase in safety during serious accidents is achieved.

In addition, an additional water reservoir is used to fill or refill the scrubber facility, e.g. in the form of reservoir tanks arranged at ground level and the like. In this case, the water supply for the scrubber facility is established by an independent pump unit, for example, which is operated by a battery module or via compressed air cylinders.

Through the combination of filling by means of wet well water, for example, and/or additional filling by the other aforementioned water reservoirs, a reliable long-term heat removal is ensured, even when there are very high decay heat outputs in the scrubber.

The Venturi section in the Venturi scrubber is advantageously formed by long Venturi tubes, the scrubbing liquid suction region whereof lies deep in the pool and which blows out above the scrubbing liquid level for the most part.

These Venturi units are preferably operated at the high Venturi speeds of >150 m/s, preferably >200 m/s, known from German patent DE 103 28 773 B3—relative to the scrubbing liquid suction area on the Venturi neck—combined with a further subsequent critical throttling.

Venturi tubes—round venturis or also flat venturis—within a neck area region >2 cm$^2$ to 20 cm$^2$ are preferably used in order to guarantee a minimum number and, with simultaneously small dimensions of <5 cm thick, preferably <3 cm thick to guarantee short scrubbing liquid feed-in paths and scrubbing liquid suction slits/areas of <50% of the neck areas, preferably at an angle of 30° to 90° to the Venturi axis, to achieve an optimum separating process.

In some cases, a version with short Venturi tubes or a combination of short and long Venturi tubes which blows out below the water level may also be advantageous.

The separation of the scrubbing liquid from the gas flow purified in the Venturi tube preferably takes place in stages.

Part of the charged scrubbing liquid is separated right at the Venturi outlet by means of impact separation. To further minimize the water requirement during the start-up phase, there can be a separation of the Venturi liquid at the outlet pipe by an impact separator and selective return into the suction region. In addition, very high empty pipe speeds of >1 to 3 m/s, for example, and selective drop entrainment which leads to further harmful substance separation through the formation of highly effective reaction surfaces, are advantageously set.

In a subsequent, highly effective centrifugal force separator stage which preferably contains a high-speed blade separator with a high-speed and low-speed range, particularly with >3, preferably >10, blade rows which are preferably flowed through horizontally at speeds >5 m/s h, in order to achieve small limiting droplet diameters <10 µm, the scrubbing liquid is separated from the gas flow and conducted back into the pool.

By using an upstream agglomerator/demister, there is a possibility of reducing the limiting droplet diameter to values <5 µm and therefore greatly increasing the separation rate, particularly of small drops.

In a further demister stage which is preferably occupied by metal fibres of >60 µm thickness graduated to 8 µm thickness, a further agglomeration of the remaining fine droplets and also a partial separation of fine aerosols can also take place. In addition, further fibre mats with a finer configuration or sintering pore filters can be included downstream.

This particular combination with permanently high Venturi speeds—adjusted by means of subsequent critical throttling—and the high empty pipe speed and also the centrifugal force and demister separation allows a separation/retention of aerosols with a particle diameter of >1 µm to >99.9% and simultaneously also for penetrating fine aerosols with particle diameters of <1 µm at least to >99, and also a parallel iodine separation of up to >99%.

In addition, by the dropping of direct feeding of chemicals, such as sodium hydroxide (NaOH) and/or thiosulphates, for example, effective iodine sorption is achieved. The inclusion of this chemical feed may take place via pressure difference release or via a thermally soldered valve, for example.

The combination illustrated particularly enables a very high gas throughput to take place in the smallest space. It is thereby possible for very compact, throughput-intensive Venturi units to be formed which can additionally be divided (split) into small Venturi scrubber units. In this way, units can be integrated in areas with only very limited installation space available.

This crucially reduces costs and the building screening effect and protective effect also lead to greater functional reliability of the facility.

The individual facilities in this case are advantageously connected in a communicating manner and may, particularly in the case of separate float valve feeding, be housed individually or in groups at different levels too.

In summary, the advantages achieved using the invention are particularly that by means of a scrubber facility of a containment venting system installed outside the containment, which scrubber facility is connected to a reservoir for scrubbing liquid located within the containment, a passive first fill and subsequent feeding of the scrubber facility, preferably with float filling level control, is made possible through system-inherent suction pressure generation facilitated as a result of accident conditions with a simultaneously particularly compact, space-saving design. Particularly when using a high-speed Venturi scrubber controlled by subsequent critical pressure relief of the venting flow during sliding pressure operation, highly effective activity retention can be achieved. The fact that during normal power station operation a "dry" scrubber facility not filled with scrubbing liquid can be kept on standby for accident operation means that further advantages in relation to cost, weight, etc. are achieved.

Other features which are considered as characteristic for the invention are set forth in the appended claims.

Although the invention is illustrated and described herein as embodied in a venting system for the containment of a nuclear plant and method of operating the venting system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a highly simplified, schematic depiction of an overview of a nuclear power station of the boiling water reactor type with a containment venting system according to the invention.

DETAILED DESCRIPTION OF THE INVENTION

Figure 1:
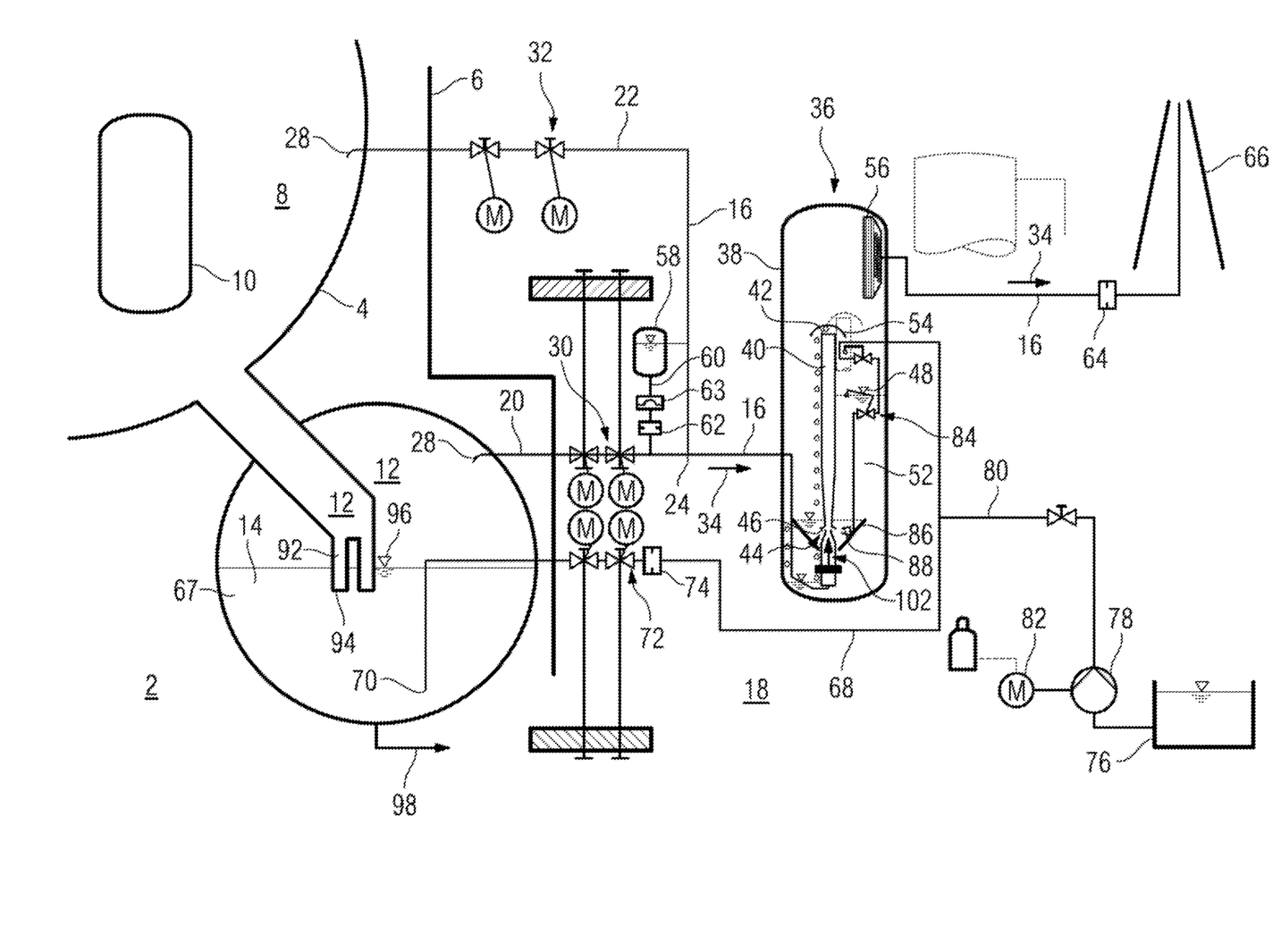

Turning now to the single FIGURE of the drawing in detail, there is shown a nuclear plant depicted in sections being a nuclear power plant of the boiling water reactor (BWR) kind. Within a safety enclosure hermetically sealed against the outside environment/a safety tank made of steel and/or reinforced concrete referred to as a containment 4 is arranged a dry well 8 which contains the reactor pressure vessel 10, among other things. The inner chamber enclosed by the containment 4 is also referred to as the safety enclosure or occasionally as the confinement. In an alternative nomenclature, the containment (or else the wall thereof) is referred to as the containment casing or containment building, while the inner chamber itself is referred to as in short as the containment. In addition, a safety barrier or building wall 6 against external events may be erected around the containment 4 as an integral part of the reactor building. Contrary to the depiction in the FIGURE, the building wall 6 may also be disposed at a greater distance from the containment 4 and enclose a part or all of the system components described below outside the containment 4. Alternatively, separate plant buildings and system zones may be erected.

Furthermore, an annular wet well 12, for example, is disposed within the containment 4, into which the steam produced for the purposes of condensation is introduced during serious accidents involving the release of steam within the dry well 8. In this case, the condensate 14 accumulates in the wet well 12. For this purpose, the wet well 12 is in fluidic contact with the dry well 8, for example via an overflow line sealed during normal operation following a siphon principle with a liquid plug, also referred to as a downcomer tube 92, so that when a predetermined overpressure occurs in the dry well 8, there is an overflow of steam into the wet well 12. The atmosphere in the dry well 8 is largely rendered inert in such situations, usually by the released steam and by the introduction of nitrogen where necessary.

The FIGURE shows the arrangement based on the example of a BWR plant with a wet well 12 configured in the shape of a toroid. The principle applies in the same way too wet wells which are configured without a toroid but with a liner and/or concrete casing.

The downcomer tubes 92 are normally immersed during reactor operation with their (lower) outlet openings 94 in the liquid 14, substantially water, contained up to a normal filling level 96 in the wet well 12. During accidents involving an overflow of steam and non-condensable gases from the dry well 8 into the wet well 12, this involves cleaning or scrubbing of the inflowing gas-steam mixture in the liquid 14. The immersion depth of the downcomer tubes 92 determines the pressure difference between the dry well 8 and the wet well 12 required to begin the overflow. It is typically between 0.2 and up to 0.5 bar. If this pressure difference is exceeded, there is an overflow and, as a consequence of this, a rise in pressure in the wet well 12 in the medium term—despite the partial condensation of steam constituents. It can be said overall that an overpressure existing in the dry well 8 in respect of the environment outside the containment 4 is transferred at least in part to the wet well 12. Consequently, during the course of a serious accident there is an equalization of the (over) pressure conditions in the entire containment 4. This applies particularly when, as a result of constant evaporation, the level of liquid 14 in the wet well 12 drops below the outlet openings 94 of the downcomer tubes 92, so that there is free pressure equalization between the dry well 8 and the wet well 12.

Despite the measures described, during serious accidents with a massive release of steam there may be a critical overpressure within the containment 4 which could endanger the integrity of the containment 4. In order to counter scenarios of this kind, filtered venting of the containment 4 as a constituent part of the safety systems is provided where necessary in the nuclear power station according to the FIGURE. For this purpose, a pressure-relief line 16 closed by a shutoff device during normal operation of the nuclear power station is fed through the containment, through which line a pressure-relief flow is conducted out of the containment 4 into the outside environment when the shutoff device is open. This process is also referred to as venting. The predominantly gaseous pressure-relief flow, which particularly contains steam constituents and also non-condensable gases, is referred to correspondingly as the venting flow. The pressure-relief line 16 is also referred to as the venting line. This is referred to overall as a venting system 18.

In the present case, the pressure-relief line 16 contains two separate line sections 20 and 22 on the inlet side which are combined further downstream into a union point 24. The first line section 20 has an inlet opening 26 communicating with the inner chamber of the wet well 12. To be more precise, the inlet opening 26 is arranged in the ceiling region of the wet well 12, namely in the space normally filled with gas above the liquid or above the (liquid) condensate 14 accumulating due to steam condensation in the floor region. The second line section 22 has an inlet opening 28 communicating with the inner chamber of the dry well 8, which inlet opening is significantly higher geodetically than the inlet opening 26 of the first line section 20.

Each of the two line sections 20 and 22 is provided with its own shutoff device 30 or 32 which is formed as a twin device in each case with two series-connected individual devices (tandem configuration). The shutoff device 30 or 32 in each case lies, when viewed in the flow direction 34 of the venting flow, directly behind the associated duct through the containment, so that the venting flow can only be removed where necessary exclusively via the first line section 20 or the second line section 22 from the spatial region of the containment 4 assigned in each case or also via both line sections 20 and 22 simultaneously (insofar as the two inlet openings 26 and 28 lie at comparable pressure levels). Particularly in the first phase of the accident procedure, the venting flow can be removed from the wet well 12 exclusively via the first line section 20. If there is a complete overflow of the wet well 12 in a subsequent phase, this line section 20 is closed and instead of it the second line section 22 connected to the dry well 8 is activated for venting.

In order to reduce the release of radioactive activity into the environment during venting to a justifiable degree, corresponding retention systems in the form of filter devices and scrubber facilities are inserted into the pressure-relief line 16. Since the space available within the containment 4 is generally limited in the case of a boiling water reactor, these facilities are installed outside the containment in the case of the plant according to the FIGURE. Nevertheless, in order to put in place adequate protection against external events, the installation takes place in suitable buildings.

In particular, a wet scrubber 36 installed outside the containment 4 for the Venturi scrubber-type venting flow is present, which wet scrubber is inserted in the pressure-relief line 16 downstream of the union point 24 for the two line sections 20 and 22 and therefore downstream of each shutoff device 30 and 32. The wet scrubber 36 contains a washing liquid tank 38 or a washing tank for short, in which at least one Venturi tube 40, preferably a plurality of Venturi tubes 40, is arranged, preferably in a vertical or slightly inclined orientation. On the input side, the respective Venturi tube 40 is connected at its lower end to the upstream section of the pressure-relief line 16 and at the output end the outlet opening 42 of the Venturi tube 40 lying higher up projects into the washing liquid tank 38. In the neck portion lying therebetween, which tapers in the manner of a Venturi tube or a Laval nozzle, more precisely at the narrowest point referred to as the neck portion 44, the Venturi tube 40 has an intake opening 46 for scrubbing liquid configured in the manner of a slot, for example, particularly as an annular slot in the case of round Venturi tubes.

In the case of the hitherto predominantly customary system design, the washing liquid tank 38 is filled with a scrubbing liquid 52 during venting up to a design filling level 48 which lies above the intake opening 46 and below the outlet opening 42. This method of operation is illustrated in the right half of the wet scrubber 36 depicted in the FIGURE (the left half and the right half each represent different operating states of one and the same scrubber device). The venting flow entering the Venturi tube 40 from below reaches its greatest flow speed at the neck portion 44 and in so doing draws the surrounding scrubbing liquid 52 out of the washing liquid tank 38 via the intake opening 46, which scrubbing liquid is entrained in the form of a fine mist of droplets. Due to the fragmentation and misting of the scrubbing liquid 52, an internal interaction takes place within the Venturi tube 40 between the venting flow and the scrubbing liquid 52, as a result of which airborne or gas-borne activity entrained in the venting flow in the form of aerosols and iodine compounds are deposited in the scrubbing liquid droplets.

The venting flow mixed with the activity-laden scrubbing liquid mist then leaves the outlet opening 42, preferably in the manner of a freely blowing arrangement at the upper end of the Venturi tube 40, in other words above the scrubbing liquid level. A first separation of the scrubbing liquid 52, on the one hand, and the gaseous venting flow, on the other, takes place there at an impact separator 54. In this case, the radiologically active components remain for the most part bound in the scrubbing liquid 52 which sinks down again according to the principle of gravitational separation. The cleaned venting gas flow, on the other hand, accumulates above the scrubbing liquid level and enters the downstream section of the pressure-relief line 16 after flowing through a fine separator 56, also referred to as a demister, into the downstream section of the pressure-relief line 16 which is connected to the head of the washing liquid tank 38.

Water is preferably substantially used as the scrubbing liquid 52, the water being combined with chemical additives or reagents from a chemical tank 58, where necessary. The chemical tank 58 in this case is connected to the pressure-relief line 16 upstream of the wet scrubber 36 via a connection line 60 in the exemplary embodiment. It is preferably installed in a geodetically elevated position, so that the feeding of chemicals into the venting flow takes place purely passively by gravity. A preferably adjustable throttle valve 62 in the connection line 60 produces the desired dosing. The shutoff device 63, which is closed when the venting system is on standby, in the connection line 60 is configured for automatic opening where necessary as a bursting element or by a fusible link. Instead of the feeding of chemicals provided for here via the venting flow which entrains them within the pressure-relief line 16 and conveys them into the washing liquid tank 38, a direct attachment of the chemical tank 58 or the connection line 60 to the washing liquid tank 38 can take place.

Instead of a single wet scrubber 36, there may also be a plurality of wet scrubbers 36 inserted in parallel fluidically, particularly in order to adapt to existing structural circumstances. To this end, upstream of the scrubber section split into partial units in this manner (split version) the pressure-relief line 16 has corresponding branches to partial sections and unions/junctions possibly upstream of the scrubber section.

Downstream of the wet scrubber 36 the cleaned venting flow passes through a throttle device/throttle valve 64 inserted in the end portion of the pressure-relief line 16 there and is relaxed during this approximately to the ambient atmospheric pressure. Further filter devices not shown here, particularly of the dry filter and/or sorbent filter type, may also be present upstream or downstream of the throttle device 64 in the end portion of the pressure-relief line 16. Finally, the cleaned and pressure-relieved venting flow is released into the environment via a flue 66 or another outlet opening.

The venting system 18 in the present case is configured for particularly high retention rates of the wet scrubber 36 during venting operation. As described in German patent DE 103 28 773 B3, at the time owned by Framatome ANP GmbH (now AREVA GmbH), this is possible in that a particularly high flow speed of the venting flow, measured at the neck portion 44 of the Venturi tube 40, of 150 m/s or more, for example, is set. This is achieved purely passively through the so-called critical pressure relief of the venting flow at the throttle device 64 in sliding pressure regime. For details of the system design which makes this possible, particularly with regard to the configuration and dimensioning of the flow-guiding components, and also the associated method aspects, reference is made to the aforementioned German patent DE 103 28 773 B3 (corresponding to U.S. Pat. No. 8,218,709) which is hereby expressly incorporated by reference in the present description.

Correspondingly, the end portion of the pressure-relief line 16 lying upstream of the throttle device 64 during venting operation forms a low-pressure section approximately at atmospheric pressure (approximately 1 bar). The starting section of the pressure-relief line 16, on the other hand, forms by contrast a high-pressure section approximately at containment pressure (typically 2 to 4 bar or more at the start of venting). However, a quite clear drop in pressure (from roughly 0.3 to 1 bar) usually likewise occurs in the Venturi tube 40 of the wet scrubber 36 and/or also before this at the Venturi inlet, particularly with a corresponding, targeted design and configuration. The throttle portion 102 in the pressure-relief line 16 configured in this manner upstream of the outlet opening 42 into the washing liquid tank 38, which throttle portion can be expanded, comparatively speaking, in the flow direction 34 or also concentrated in one or more short throttle points, is only suggested schematically in the FIGURE. With this kind of characterization of the pressure stages (two-stage pressure drop) it is therefore possible to refer to a high-pressure portion upstream of the Venturi tube 40, a mid-pressure portion in the line portion lying further downstream up to the throttle device 64 and a low-pressure portion downstream of the throttle device 64 (in relation to the venting operation).

As already expressed in the aforementioned German patent DE 103 28 773 B3, a central problem when operating a venting system 18 of this kind is the decay heat of the fission products accumulating in the scrubbing liquid 52. This is because the decay heat leads to the evaporation of the scrubbing liquid supply in the wet scrubber 36, which is associated with the risk of "dry running". This, in turn, would to a large extent bring about the loss of the actually desirable filter and retention function. In the plant according to German patent DE 103 28 773 B3, the problem is solved in that, on the one hand, a recycling of activity-loading, hot scrubbing liquid 52 into the containment 4 is provided. On the other hand, the initial scrubbing liquid store in the wet scrubber 36 is comparatively generously sized. In addition, the "used" scrubbing liquid 52 from evaporation and recycling in the wet scrubber 36 is replaced by subsequent feeding of comparatively cold scrubbing liquid 52 from an external storage tank. This results in comparatively large-capacity tanks with a corresponding space requirement and high production and maintenance costs.

In order to avoid this, an essentially different approach is taken with the venting system 18 according to the FIGURE.

The wet scrubber 36 is namely kept dry in standby mode (that is: when the nuclear power station is in normal operation). The washing liquid tank 38 is only filled with scrubbing liquid 52 shortly before the venting operation begins. For this purpose, the liquid 14 present in the wet well 12 and/or the condensate accumulating there under accident conditions is transferred into the washing liquid tank 38 and used there as scrubbing liquid 52. When the venting system 18 is on standby, the wet well 12 therefore forms a still empty or only partly full reservoir 67 for liquid 14 which is largely filled subsequently under accident conditions with activation of the venting system 18, the liquid being used as a scrubbing liquid 52 in the wet scrubber 36. The transfer preferably takes place purely passively without resorting to electrically operated or otherwise active components.

In concrete terms, an overflow line effective as a top-up line or a feeding line 68 for the liquid/condensate 14 is guided for this purpose out of the wet well 12 through the containment into the washing liquid tank 38 of the wet scrubber 36. The inlet opening 70 of the feeding line 68 is arranged in the floor area of the wet well 12 and lies, particularly when steam condensation begins in the wet well 12, reliably below the developing condensate liquid level. The arrangement within the wet well 12 at the lowest possible point, particularly below the outlet openings 94 of the downcomer tubes 92, means that the inlet opening 70 is still immersed in the liquid 14, even in situations where the level is very low. When viewed in the overflow direction of the liquid/condensate 14, just behind the duct through the containment 6, a shutoff device 72 is inserted in the feeding line 68. Further downstream, an optional throttle valve 74 limits the flow through the feeding line 68 in a desirable manner. Finally, the feeding line 68 opens out at the end in the inner chamber of the washing liquid tank 38.

Alternatively—not depicted here—the feeding line 70 may be connected to a drainage and residual heat removal system 98 present in the lower region or beneath the wet well 12 and connected thereto.

During normal operation of the nuclear power station, the shutoff device 72 in the feeding line 68 is closed, likewise the shutoff devices 30 and 32 in the two line sections 20 and 22 of the pressure-relief line 16. There is still no scrubbing liquid 52 in the washing liquid tank 38 of the wet scrubber 36; instead, it is dry.

In the event of an incipient coolant loss accident with a massive release of steam in the dry well 8 of the nuclear power station and, consequently, also in the wet well 12 and also with condensate 14 accumulating there, during a comparatively short activation phase of a few seconds to minutes, with the shutoff devices 30 and 32 in the pressure-relief line 16 closed to begin with, the shutoff device 72 in the feeding line 68 for the liquid/condensate 14 is opened. Since, as described earlier, the inner chamber of the wet well 12 is at a pressure level of 2 to 6 bar, for example, due to an accident, while in the inner chamber of the washing liquid tank 38 during the activation phase an ambient pressure of roughly 1 bar still prevails, the emerging static pressure difference of around 1 to 5 bars in this case drives the liquid/condensate 14 from the wet well 12 through the feeding line 68 into the washing liquid tank 38. This means that in a purely passive manner, in other words without the use of electric pumps and the like, an initial filling of the washing liquid tank 38 takes place up to the usual design filling level 48 already referred to. The comparatively large driving pressure difference means that height differences between the installation sites of the reservoir 67 and the wet scrubber 36 of up to around 30 m or more can be overcome.

As soon as the operational readiness of the wet scrubber 36 is established in this way, by opening the shutoff devices 30 and/or 32 in the pressure-relief line 16, the actual venting operation can be initiated with wet scrubbing of the venting flow. The pressure grading described above with a high-pressure portion, a mid-pressure portion and a low-pressure portion in the pressure-relief line 16 is then created as a result of the flow dynamic. The pressure differential existing between the wet well 12 and the washing liquid tank 38, which is typically only 0.3 to 1 bar in this operating state, however, drives the liquid/condensate 14 from the wet well 12 into the wet scrubber 36, where it is active as a scrubbing liquid 52, when the shutoff device 72 is open. In this way, the subsequent feeding of scrubbing liquid 52 consumed by evaporation also takes place preferably purely passively from an internal reservoir 67 which is in any case present due to the underlying accident conditions.

Based on this design, an additionally present external storage tank 76 for scrubbing liquid 52 may exhibit a comparatively small volume compared with previous plants. The storage tank 76 is installed in a geodetically high position, for example, such that a feeding or refeeding of scrubbing liquid 52 into the washing liquid tank 38 is made possible by the forces of gravity. Alternatively or in addition, as depicted in the FIGURE, a delivery pump 78 is inserted in the connection line 80 between the storage tank 76 and the wet scrubber 36, which pump is driven by a drive motor 82 of the electric motor type, for example, or by a gas expansion motor or the like. Corresponding emergency power units, batteries, storage batteries, compressed gas canisters, etc. are present for this purpose. Alternatively, the liquid may be conveyed directly by a pressurized propellant gas.

The scrubbing liquid filling level in the washing liquid tank 38 may be automatically regulated in the feeding line 68, as indicated in the wet scrubber 36 shown in the right half of the FIGURE by a passive float valve 84 or the like. This means that the valve body of the control valve is actuated depending on the current water level by a float mechanically coupled thereto in the washing fluid tank 38. In this way, the shutoff device 72 in the feeding line 68 need only be opened once at the start of the activation phase and no longer need be activated after opening, as the filling level is then controlled via the float valve 84.

As an alternative to the operating method described above, in which the actual venting process is preceded by an activation phase for the initial filling of the wet scrubber 36, a simultaneous or contemporaneous opening of the shutoff device(s) 30 or 32 may also take place in the pressure-relief line 16 and of the shutoff device 72 in the feeding line 68. In this case, the initial filling of the wet scrubber 36 with scrubbing liquid 52 takes place at the same time as the start of the venting process, due to the aforementioned dynamically adjusted pressure difference of typically 0.3 to 1 bar between the wet well 12 and the washing liquid tank 38. In order to keep the initial dry operation of the wet scrubber 36 as short as possible, the washing liquid tank 38 is designed with suitably selected inner contouring and/or inner partitioning, such that there is a comparatively quick rise in the scrubbing liquid level in the region of the intake opening 46 of the Venturi tube 40 during the introduction of scrubbing liquid 52 from the internal or external reservoir.

As shown in the FIGURE, within the comparatively large washing liquid tank 38 which encloses the Venturi arrangement as a whole and seals it in respect of the environment, a substantially smaller, upwardly open washing liquid tank or pool 86 may be arranged, for example, which encloses the Venturi tube 40 in the region of the neck portion 44 with the intake opening 46 and in which the outlet opening 88 of the feeding line 68 is immersed or opens out. This small pool 86 configured in the exemplary embodiment in the manner of a collecting funnel or an upwardly open annular chamber also particularly collects the scrubbing liquid droplets falling from the impact separator 54 and possibly from the fine separator 56 as completely as possible. For this purpose, a return line (not shown) may be conducted from the separator in each case into the pool 86. The pool 86 has a volume of <1/10 of the total volume of the washing liquid container 38, for example—relative to the design filling level 48—and, accordingly, fills up to the upper edge within the shortest time, for example <10 min, preferably <3 min, at the start of the combined venting and filling process, as indicated in the left half of the wet scrubber 36 shown in the FIGURE. As a result of this, the wet scrubbing of the venting flow described further above starts very early. As the venting operation progresses, the remaining washing liquid tank 38 is also filled up to the desired design filling level 48, which guarantees particularly balanced operating conditions.

A configuration of this kind is practical particularly when a plurality of Venturi tubes 40 inserted in parallel fluidically via a distributor is arranged within the enclosure formed by the washing liquid tank 38, because the enclosing washing liquid tank 38 is then necessarily relatively large in volume. Each or at least the vast majority of the Venturi tubes 40 in this case is advantageously provided with its own small pool 86 for rapid initial filling.

A continuous or occasional return or recirculation of scrubbing liquid 52 from the washing liquid tank 38 into the containment 4 via a return line not shown here may optionally be provided for, into which a delivery pump is inserted to overcome the rise in pressure. Reference is made in this respect to the predecessor German patent DE 103 28 773 B3, as already referred to.

Even if in the preceding description the particularly important case of a boiling water reactor with removal of the scrubbing liquid 52 from the wet well 12 were emphasized, it is still possible to resort to other internal liquid reservoirs within the containment 4. In particular, the design described can also be used with a pressurized water reactor. In this case, for example, sump water can be drawn out of the sump region of the reactor building. In addition, other control basins, storage basins or storage tanks installed in the containment 4 can be used as reservoirs for the scrubbing liquid to be removed. In these cases too, the reservoir 67 in question should preferably be arranged in such a manner and connected to the (remaining) containment 4 fluidically or at the gas pressure end, such that the overpressure prevailing in the containment 4 under accident conditions can be used for passive conveyance of the liquid 14 out of the reservoir 67 into the wet scrubber 36.

The following is a summary list of reference numerals and the corresponding structure used in the above description of the invention:

| | |
|---|---|
| 2 | Nuclear plant |
| 4 | Containment |
| 6 | Building wall |
| 8 | Dry well |
| 10 | Reactor pressure vessel |
| 12 | Wet well |
| 14 | Condensate/liquid |
| 16 | Pressure-relief line |
| 18 | Venting system |
| 20 | Line section |
| 22 | Line section |
| 24 | Union point |
| 26 | Inlet opening |
| 28 | Inlet opening |
| 30 | Shutoff device |
| 32 | Shutoff device |
| 34 | Flow direction |
| 36 | Wet scrubber |
| 38 | Washing liquid tank |
| 40 | Venturi tube |
| 42 | Outlet opening |
| 44 | Neck portion |
| 46 | Intake opening |
| 48 | Design filling level |
| 52 | Scrubbing liquid |
| 54 | Impact separator |
| 56 | Fine separator |
| 58 | Chemical tank |
| 60 | Connection line |
| 62 | Throttle valve |
| 64 | Throttle device |
| 66 | Flue |
| 67 | Reservoir |
| 68 | Feeding line |
| 70 | Inlet opening |
| 72 | Shutoff device |
| 74 | Throttle valve |
| 76 | Storage tank |
| 78 | Delivery pump |
| 80 | Connection line |
| 82 | Drive motor |
| 84 | Float valve |
| 86 | Pool |
| 88 | Outlet opening |
| 92 | Downcomer tube |
| 94 | Outlet opening |
| 96 | Normal filling level |
| 98 | Drainage and residual heat removal system |
| | Throttle portion |

The invention claimed is:

1. A pressure-relief system for a containment of a nuclear plant, the pressure-relief system comprising:
   a shutoff device;
   a pressure-relief line being led through the containment and being closed by said shutoff device;
   a wet scrubber in a section of said pressure-relief line lying outside the containment, for a pressure-relief gas flow developing in a pressure-relief operating mode with said shutoff device being open;
   a reservoir disposed in the containment in such a way that an overpressure, as compared with an outer environment, present in the containment, is transferred completely to said reservoir;
   a further shutoff device; and
   a feeding line, separate from and in addition to said pressure-relief line, leading from said reservoir to said wet scrubber and being closed by said further shutoff device, said feeding line configured to feed a liquid active as a scrubbing liquid from said reservoir to said wet scrubber; and
   said wet scrubber containing a washing liquid tank which is sealed with respect to a rest of an inner chamber of the containment; and
   said pressure-relief line having a throttle portion disposed upstream of a point at which said pressure-relief line opens inside said washing liquid tank.

2. The pressure-relief system according to claim 1, wherein said reservoir has a condensation chamber.

3. The pressure-relief system according to claim 1, wherein said reservoir is a pool, a pressure of said pool is equalized with respect to a rest of the containment.

4. The pressure-relief system according to claim 1, wherein said throttle portion is configured such that, at a start of a pressure-relief process, said shut-off device in said pressure-relief line being open and a pressure inside the containment being at least 2 bar absolute, a pressure inside said washing liquid tank is reduced by comparison by at least 0.3 bar.

5. The pressure-relief system according to claim 1, further comprising a fill-level control, formed by a float valve inside said washing liquid tank, for the scrubbing liquid fed in via said feeding line.

6. The pressure-relief system according to claim 1 wherein said wet scrubber is a Venturi scrubber having a Venturi tube disposed in said washing liquid tank and at a neck portion of said Venturi tube there is an intake opening formed therein for Venturi injection of the scrubbing liquid into the pressure-relief gas flow.

7. The pressure-relief system according to claim 6, further comprising an inner liquid tank for the scrubbing liquid disposed inside said washing liquid tank and encloses said intake opening in said Venturi tube, a capacity of said inner liquid tank is less than 1/10 of a total volume capacity, relative to a design filling level, of said washing liquid tank.

8. The pressure-relief system according to claim 1, further comprising a throttle device disposed in said pressure-relief line downstream of said wet scrubber when viewed in a flow direction of the pressure-relief gas flow, said throttle device configured for critical pressure relief of the pressure-relief gas flow.

9. The pressure-relief system according to claim 1, further comprising a drainage and residual heat removal system connected to said reservoir.

10. The pressure-relief system according to claim 3, wherein said a pool is an open pool.

11. The pressure-relief system according to claim 1, wherein said throttle portion is configured such that, at a start of a pressure-relief process, said shut-off device in said pressure-relief line being open and a pressure inside the containment being at least 4 bar absolute, a pressure inside said washing liquid tank is reduced by comparison by at least 1 bar.

12. A nuclear plant, comprising:
   a containment; and
   a pressure-relief system for said containment, said pressure-relief system containing:
   a shutoff device;
   a pressure-relief line being led through said containment and being closed by said shutoff device;
   a wet scrubber in a section of said pressure-relief line lying outside said containment, for a pressure-relief gas flow developing in a pressure-relief operating mode with said shutoff device being open;
   a reservoir disposed in said containment in such a way that an overpressure, as compared with an outer environment, present in said containment, is transferred completely to said reservoir;
   a further shutoff device; and
   a feeding line, separate from and in addition to said pressure-relief line, leading from said reservoir to said wet scrubber and being closed by said further shutoff device, said feeding line configured to feed a liquid active as a scrubbing liquid from said reservoir to said wet scrubber; and said wet scrubber containing a washing liquid tank which is sealed with respect to a rest of an inner chamber of the containment; and said pressure-relief line having a throttle portion disposed upstream of a point at which said pressure-relief line opens inside said washing liquid tank.

13. The nuclear plant according to claim 12, wherein said nuclear plant is a boiling water reactor nuclear plant.

14. A method for operating a pressure-relief system, the pressure-relief system containing:

a shutoff device;

a pressure-relief line being led through a containment and being closed by the shutoff device;

a wet scrubber being switched into a section of the pressure-relief line lying outside the containment, for a pressure-relief gas flow developing in a pressure-relief operating mode with the shutoff device being open;

a reservoir disposed in the containment in such a way that an overpressure, as compared with an outer environment, present in the containment, is transferred completely to the reservoir;

a further shutoff device; and a feeding line, separate from and in addition to said pressure-relief line, leading from the reservoir to the wet scrubber and being closed by the further shutoff device, said feeding line configured to feed a liquid active as a scrubbing liquid from the reservoir to the wet scrubber;

which method comprises the steps of:

prior to or during a pressure-relief process, conveying the liquid from the reservoir into the wet scrubber, by means of the feeding line, as a result of a pressure difference between the containment and the wet scrubber.

15. The method according to claim 14, wherein, during an activation phase preceding the pressure-relief process, filling the wet scrubber for a first time by the further shut-off device in the feeding line being opened while the shut-off device in the pressure-relief line is closed.

16. The method according to claim 14, wherein, during the pressure-relief process, the shut-off device in the pressure-relief line being open and the shut-off device in the feeding line being open, used scrubbing liquid is fed back into the wet scrubber.

* * * * *